United States Patent [19]
Kao et al.

[11] Patent Number: 4,967,272
[45] Date of Patent: Oct. 30, 1990

[54] BANDWIDTH REDUCTION AND MULTIPLEXING OF MULTIPLE COMPONENT TV SIGNALS

[75] Inventors: Yih-Sien Kao, Gaithersburg; Lin-nan Lee, Potomac, both of Md.

[73] Assignee: Communications Satellite Corporation, Washington, D.C.

[21] Appl. No.: 418,993

[22] Filed: Oct. 6, 1989

Related U.S. Application Data

[63] Continuation of Ser. No. 149,039, Jan. 27, 1988, abandoned.

[51] Int. Cl.$^5$ .......................... H04N 7/12; H04N 7/01; H04N 7/04; H04N 11/20
[52] U.S. Cl. ...................................... 358/135; 358/136; 358/140; 358/141; 358/11
[58] Field of Search ...................... 358/11, 12, 31, 135, 358/136, 140, 141

[56] References Cited

U.S. PATENT DOCUMENTS

| | | |
|---|---|---|
| 4,527,188 | 7/1985 | Lewis, Jr. .............................. 358/23 |
| 4,594,607 | 6/1986 | Lewis, Jr. et al. ..................... 358/23 |
| 4,602,274 | 7/1986 | Acawpora et al. .................... 358/11 |
| 4,621,287 | 11/1986 | Reitmeier ............................. 358/141 |
| 4,635,098 | 1/1987 | Thong ................................... 358/14 |
| 4,641,179 | 2/1987 | Lo Cicero et al. .................... 358/12 |
| 4,663,660 | 5/1987 | Fedele et al. ........................ 358/136 |
| 4,694,338 | 9/1987 | Tsinberg .............................. 358/141 |
| 4,719,503 | 1/1980 | Graver et al. ......................... 358/12 |
| 4,745,492 | 5/1988 | Kobayashi et al. .................... 358/11 |
| 4,785,349 | 11/1988 | Keith et al. ............................ 358/13 |

FOREIGN PATENT DOCUMENTS 3435562 2/1986 Fed. Rep. of Germany .
225786 12/1983 Japan .

*Primary Examiner*—John K. Peng
*Attorney, Agent, or Firm*—Sughrue, Mion, Zinn, Macpeak and Seas

[57] ABSTRACT

In a system for transmitting analog video signals, the luminance and chrominance components are each subjected to different bandwidth reduction processes. In addition, the high and low frequency portions of the luminance component are subjected to different bandwidth reduction signal processes.

32 Claims, 7 Drawing Sheets

BANDWIDTH REDUCTION AND MULTIPLEXING OF MULTIPLE COMPONENT TV SIGNALS

This is a continuation of application No. 07/149,039 filed Jan. 27, 1988, now abandoned.

BACKGROUND OF THE INVENTION

This invention is directed to an analog video processing scheme for the transmission of multiple television signals. In its preferred embodiment, the invention is more particularly directed to such a system which permits an increase in the transmission efficiency of a satellite transponder used for television program transmission by sending multiple television signals through a single satellite transponder.

This invention is also applicable to other transmission media including, but not limited to, terrestrial broadcasting and cable distribution of TV signals.

Existing approaches can be divided into two categories: one using frequency-division-multiplexing (FDM) techniques for composite or component video signals, and the other using time-division-multiplexing (TDM) of composite video signals. Table 1 summarizes these existing methods, with the right-hand column of Table 1 describing the present invention which will be described herein.

Existing FDM/FM techniques for TV transmission via non-linear satellite channels suffer from intermodulation, e.g., intelligible crosstalk. They also require sufficient bandwidth expansion to achieve good signal-to-noise ratio. Therefore it is generally difficult to send more than two TV signals of this type through the same transponder. The TCM method adopts bandwidth compression techniques to allow more TV signals to be transmitted through the same transponder, but the type of bandwidth compression technique used in this system will cause luminance/chrominance crosstalk or interfield flickers which severely degrade the picture quality. Erroneous generation of color information from a black-and-white original picture with high-frequency content is a well-known characteristic of the TCM processing method. As an example the multi-burst test pattern, along with many other types of picture signals cannot be transmitted faithfully.

SUMMARY OF THE INVENTION

The invention uses a new bandwidth compression technique based on the component video signal format. Briefly, beginning with the video signal in YUV form, or after converting to that form if necessary, the luminance component for even lines is horizontally lowpass filtered and then horizontally decimated. For odd lines the high frequency portion of the luminance component

TABLE 1

| SPECTRAL UTILIZATION OF SPACE SEGMENT | FDM | | | TDM | | |
|---|---|---|---|---|---|---|
| SYSTEM APPROACHES | HALF-TRANSPONDER | | | | | |
| | NTSC | M-NTSC | MAC | TFM | TCM | TMVT |
| VIDEO SIGNAL FORMAT | CMPST | CMPST | YUV | CMPST | CMPST | YUV |
| VIDEO BANDWIDTH REDUCTION TECHN. | NONE | NONE | VERT. CHROMA PROC. | NONE | 2D OR 3D PROC. | 2D OR 3D PROC. |
| ARTIFACT | Y-C CROSS-TALK | Y-C CROSS-TALK | — | Y-C CROSS-TALK | Y-C CRSTLK REDUCTION OF DIAGONAL RESOLUTION | REDUCTION OF DIAGONAL RESOLUTION |
| TV CHANNEL MULTIPLEXING METHOD | FDM | FDM | FDM | TDM | TDM | TDM |
| SOUND CHANNEL TRANSMISSION METHOD | FM; DIGITAL | DIGITAL | DIGITAL | DIGITAL | DIGITAL | DIGITAL |
| MULTIPLE-ACCESS CAPABILITY | YES (2CH) | YES (2CH) | YFS (2CH) | NEEDS CONTR (2CH) | NEEDS CONTR (3CH) | NEEDS CONTR (3CH) |
| CONVERSION INTO PAL & SECAM FROM NTSC SOURCE | NEED TO CONV. INTO YUV | | READY FOR CONV. | NEED TO CONV. INTO YUV | | READY FOR CONV. |
| APPLICABILITY TO PAL & SECAM | YES | YES | YES | YES | NO | YES |

The abbreviations in the above Table should be self-explanatory, e.g. with CMPST indicating a composite video signal format and CONTR indicating the need for a controller.

Systems belonging to the first category include the Time-Frequency Multiplexing (TFM) method and the use of half-transponder transmission for an NTSC composite signal (NTSC), a modified NTSC signal (M-NTSC), and Multiplexed Analog Component (MAC) signals. Systems belonging to the second category include the Time-Compression Multiplexing (TCM) method invented by Bell Labs, which uses a bandwidth compression technique for the NTSC composite signal.

signal is vertically lowpass filtered and then vertically decimated. The chrominance component signals are both horizontally and vertically lowpass filtered and decimated. At the receive side the lines are reconstructed through the use of interpolation and signal combining, with only the loss of diagonal resolution components which is not objectionable.

In the preferred embodiment the entire luminance component signal is horizontally lowpass filtered, with the output of the lowpass filter then being subtracted from its input to obtain the high frequency component which is separately processed for the odd lines. Also, in the preferred embodiment the high frequency portion of the luminance component signal remains in decimated form after reconstruction at the receive side. Specifically, the odd line luminance component signals are left as is while even lines are reconstructed by first horizontally interpolating and then adding a vertically interpolated luminance component signal from surrounding odd lines.

The technique of the present invention can increase the transmission efficiency of the satellite transponder by 50% while maintaining the high subjective quality required for program distribution or broadcasting. It can transmit any kind of video images and different types of test patterns including multiburst, color bars, and 2T pulse without generating visible artifacts.

BRIEF DESCRIPTION OF THE DRAWINGS

The invention will be more clearly understood from the following description in conjunction with the accompanying drawings, in which.

DETAILED DESCRIPTION OF THE INVENTION

The present invention will now be described with reference to a satellite transmission system, although it is again to be noted that this is by way of example only and that the invention is applicable as well to other types of systems wherein video signals are to be transmitted. The invention will hereinafter be referred to as a Time-Multiplexed Video Transmission (TMVT) system.

Figure 1:
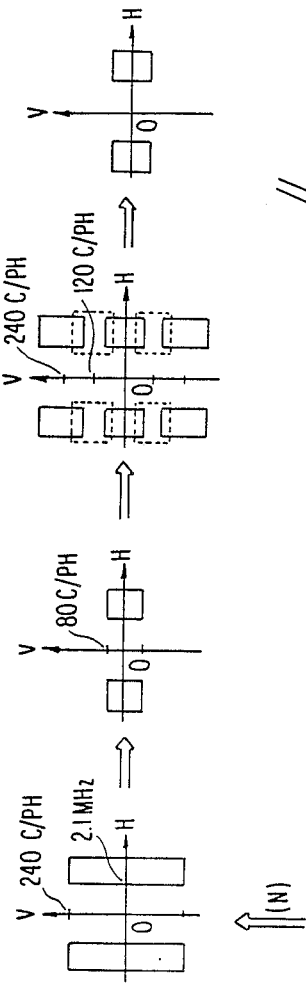
FIGS. 1(a)–1(g) are conceptual diagrams for explaining the bandwidth reduction and image reconstruction for luminance signals based on 2-D digital signal processing techniques.

The bandwidth compression method of the TMVT system is based upon the use of multi-dimensional filtering and decimation techniques at the transmit side, and the use of a multi-dimensional interpolation technique at the receive side. The YUV component signals, i.e., the Y luminance signal and the U and V chrominance signals are processed separately. FIGS. 1(a)–1(g) illustrate, based on 2-D spectral domain representation, the procedure of bandwidth reduction and image reconstruction for the luminance signal. The YUV format video signal from the video signal source will have a horizontal bandwidth of 4.2 MHz and a vertical bandwidth of 240 cycles per picture height (C/PH) as shown in FIG. 1(a). This input signal is first lowpass filtered to limit the horizontal bandwidth to 2.1 MHz as shown in FIG. 1(b). For even lines, the signal shown in FIG. 1(b) is horizontally 2:1 decimated and transmitted, and at the receiving end it is horizontally 1:2 interpolated to recover essentially the signal shown in FIG. 1(b).

For odd lines, the lowpass-filtered signal in FIG. 1(b) is subtracted from the input signal as shown in FIG. 1(c) to, in effect, recover the signal portion discarded in the first lowpass filtering operation. This will be the high frequency component of the luminance signal, which may be referred to as a "YH" component. The luminance signal in FIG. 1(c) is then vertically lowpass filtered with a cut-off of 80 C/PH (or some other cut-off e.g. 60 C/PH, which may be empirically determined to be preferable) as shown in FIG. 1(d), and is then vertically 2:1 decimated. The vertical 2:1 decimation will result in a folding over of the frequency spectrum about the 120 C/PH line, as shown in FIG. 1(e). The dotted line portions of FIG. 1(e) indicate the residual repeat frequency spectrum of the interlaced fields after being canceled out due to interlacing. This residual repeat spectrum will result in some subtraction, but the overall effect will not be significant.

At the receive side the high frequency portion of the received odd line luminance component signal is filtered and is then 1:2 interpolated vertically to obtain the signal shown in FIG. 1(f). The signals of FIGS. 1(b) and 1(f) can then be combined to obtain the spectrum of FIG. 1(g). which corresponds to the original luminance signal except for the removal of the diagonal resolution components.

By removing the diagonal resolution components of the luminance signal, its high frequency part need only be transmitted in every other line. The subjective picture quality, however is only slightly reduced since human eyes are less sensitive to the reduction of the diagonal resolution as compared to that of horizontal or vertical resolution.

The chrominance component signals U and V are both lowpass filtered in both vertical and horizontal directions, and then decimated vertically. Therefore, the amount of picture information transmitted through the transponder is significantly reduced. This, combined with the advantage of using a component transmission format which allows more over-deviation than the composite signal does, and the advantage of time-multiplexing which eliminates the need for power back-off as in FDM transmission, results in an increase of overall transmission efficiency of the satellite transponder.

It should be pointed out that this invention is not limited to TDM transmission only. The system hardware can be configured to perform time-division multiple access (TDMA) operation with the source signals originated and beamed up to the satellite from different geographical locations. In this case, it is preferred that the multiplexing of TV signals be on a field-to-field, frame-to-frame, or multi-frame-to-multi-frame basis to provide sufficient guard spaces between signal bursts from different TV channels. TDMA buffers and controllers will be needed to perform this type of operation.

Figure 2:
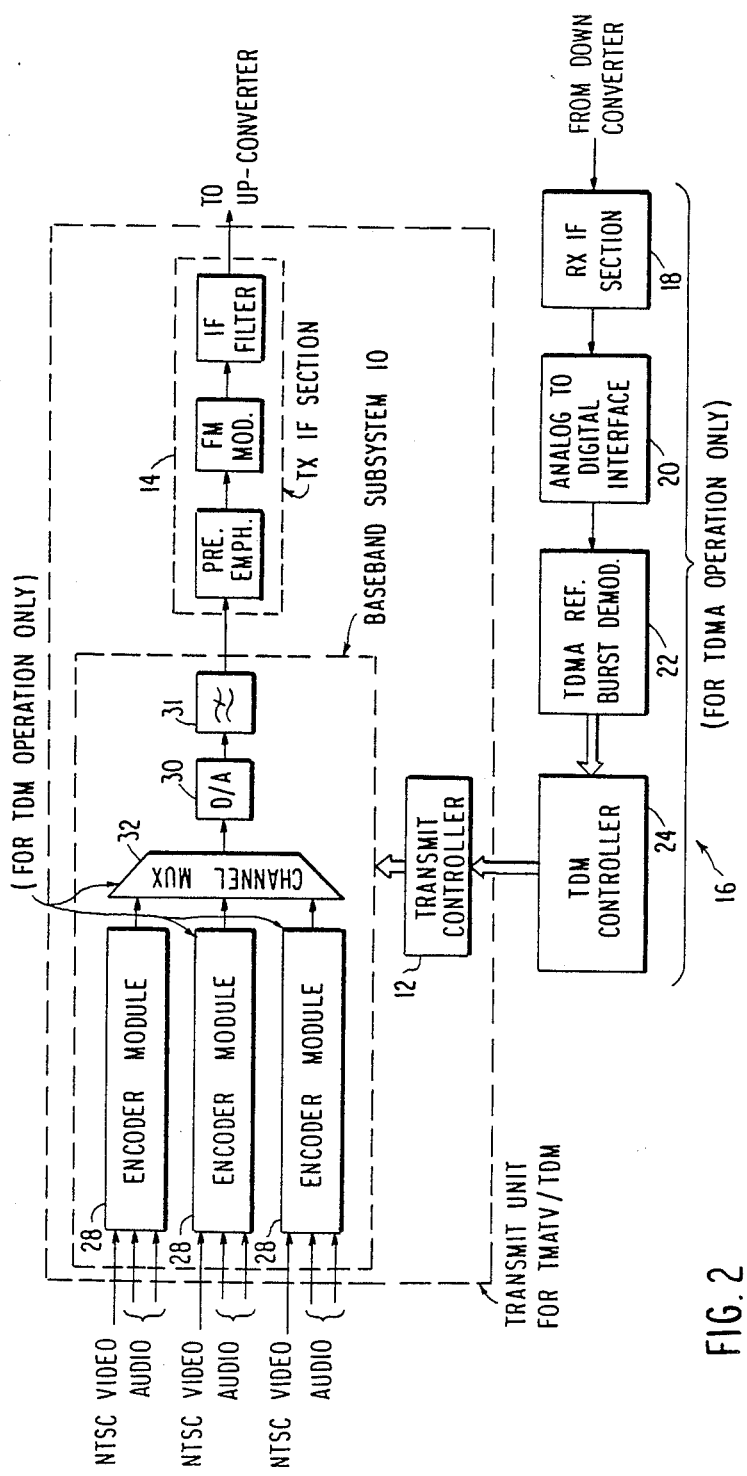
FIG. 2 is a block diagram of a transmit unit in the system according to the present invention.

The implementation of a system which performs the signal processing procedure described above will now be discussed, beginning first with the transmit unit shown in block diagram in FIG. 2. The transmit unit can be divided into three subsystems: a baseband subsystem 10, a transmit controller 12, and an IF section 14. For TDMA operation, a switch is needed at the output of the FM modulator to gate off the carrier for periods between the transmission of the frame bursts, and TDMA control circuitry 16 will be provided to enable the transmit controller 12 to control this switch. The TDMA control circuitry will include a receive IF section 18, a D/A interface 20, a TDMA reference burst demodulator 22 and a TDMA controller 24. The function of the TDMA control circuitry is to generate appropriate timing signals, and the design and operation of these components are conceptually the same as in conventional TDMA systems, although the particular timing of the signals would differ from typical TDMA systems in accordance with the requirements for transmitting analog video format signals. The TDMA controller 24 receives commands from the TDMA Reference Burst Demodulator (TDMARBD) 22 which receives and decodes the timing correction information contained in the TDMA reference burst. The IF section 14 includes a preemphasis network FM modulator and IF filter.

The baseband subsystem includes an encoder module 28 and a digital/analog interface 30. For TDM operation, the baseband subsystem will include a plurality of encoder modules 28, one for each TV broadcast, and a TV burst multiplexer 32. The TV channel multiplexer 32 multiplexes TV bursts from each encoder module 28 in time domain for the case of point-to-multi-point operation. For the case of multiple-access operation, each TV channel is transmitted from a different transmit station and no multiplexing is required In the case of point-to-multi-point transmission, a single 8-bit D/A converter 30 operated at 35.8 MHz is shared by three TV channels. This D/A converter 30 is followed by an output lowpass filter 31. In the case of multiple-access, each individual encoder module 28 will need a D/A converter 30 and an output filter 31 of this type.

The remainder of this description will assume a TDM system with three different TV channels.

The transmit controller 12 schedules the relative timing of the three TV broadcasts through a video controller 44 (FIG. 3) within each encoder module 28. In the case of multiple-access operation the transmit controller 12 is a transparent box and each video controller is under the direct control of a TDMA controller separately. The transmit controller 12 is simply a control pulse generator which sends three control signal pulses to three video controllers separately. The hardware essentially consists of digital counters and latches as is common in the art. Such a controller is used for point-to-multi-point operation only.

Figure 3:
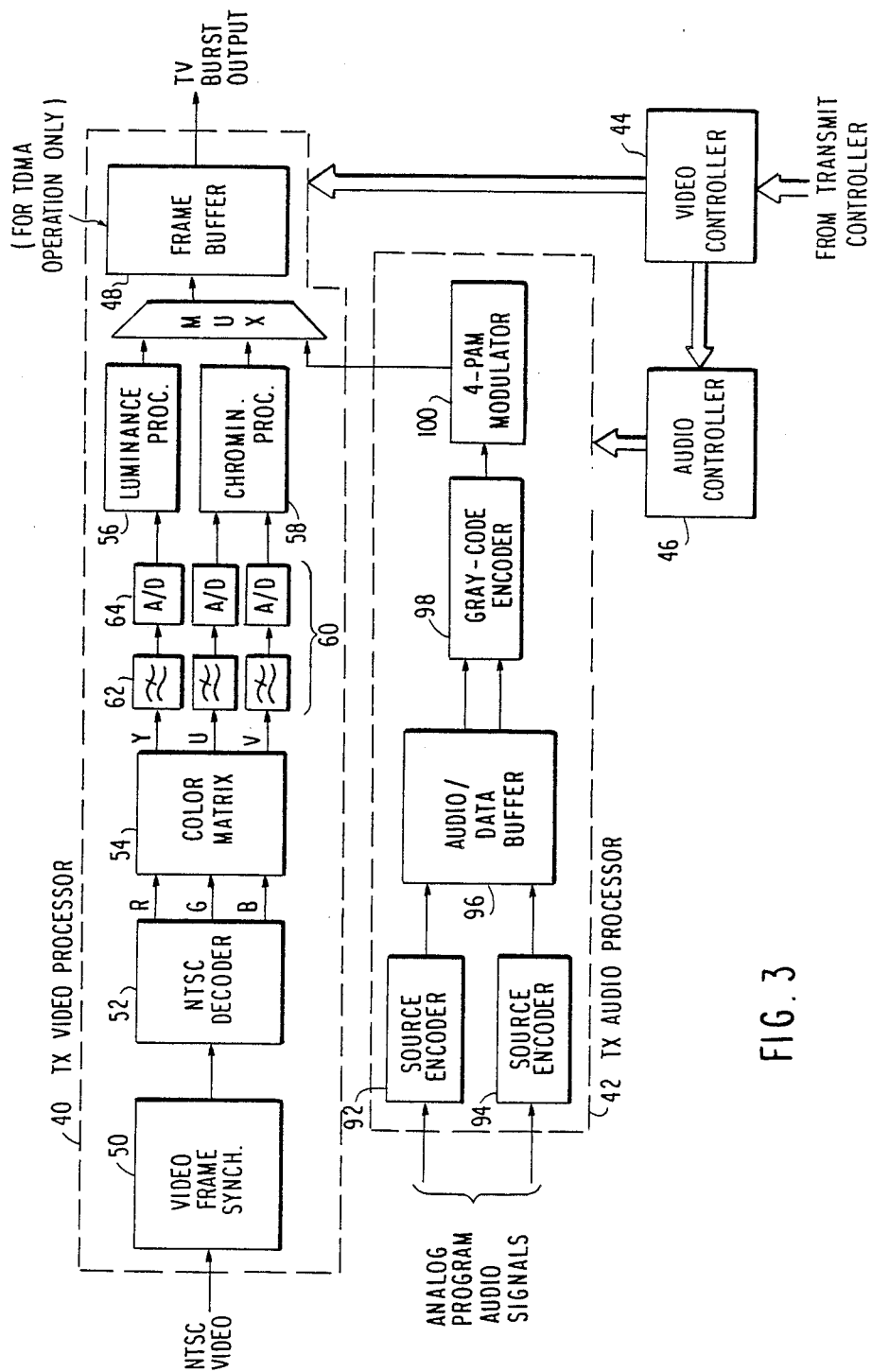
FIG. 3 is a block diagram of the encoder module of FIG. 2.

The baseband subsystem will now be discussed in more detail with reference first to FIG. 3 which shows a block diagram of an encoder module 28. Each encoder module includes a video processor 40 an audio processor 42, a video controller 44, an audio controller 46, and a frame buffer 48 which is required only for TDMA operation and which for convenience is shown as included within the video processor 40.

The transmit video processor 40 includes a video frame synchronizer 50, an NTSC-to-YUV conversion unit comprised of an NTSC decoder 52 and a color matrix circuit 54, a luminance processor 56 a chrominance processor 58 and video line buffers (typically contained within the luminance and chrominance processors 56 and 58). The processor 40 also includes A/D interface circuitry 60.

The video frame synchronizer 50 is an off-the-shelf commercial unit such as the Phaser-IV system manufactured by Digital Video Corporation. The trame synchronizer is a variable-length time delay device which delays the input video signal by genlocking it to the controlling black burst signal.

The NTSC-to-YUV converter is similarly an off-the-shelf NTSC decoder 52 and a RGB-to-YUV conversion matrix 54.

The analog-to-digital conversion circuitry 60 includes three anti-aliasing lowpass filters and three 8-bit video A/D converters 64. The three lowpass anti-aliasing filters 62 have bandwidths of 4.2 MHz, 1 MHz, and 1 MHz. for Y. U. and V. respectively. The three A/D converters, one for each of the Y. U. and V signals, are operated at 14.32 MHz, 3.58 MHz, and 3.58 MHz, respectively.

Figure 4:
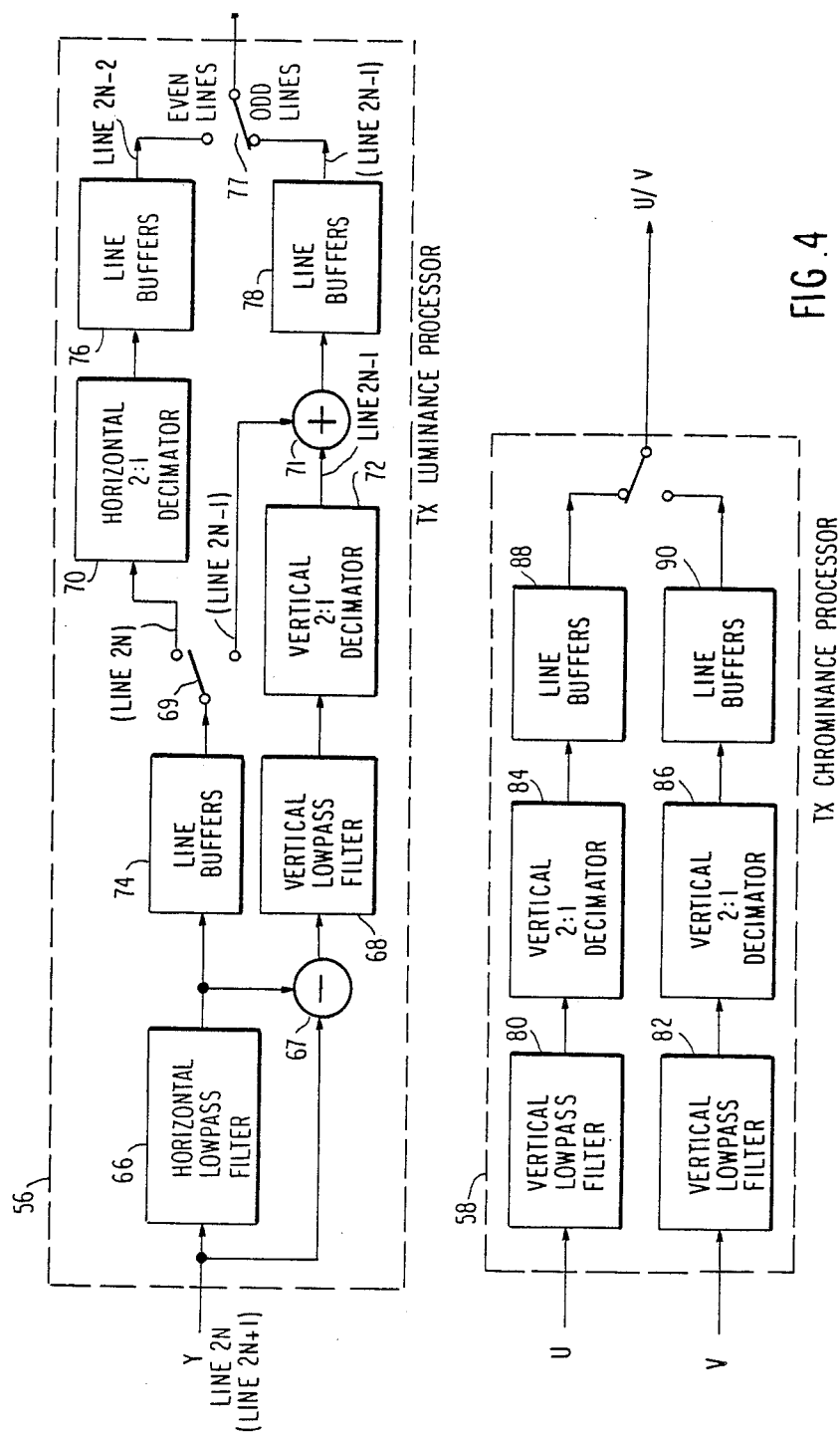
FIG. 4 is a block diagram of the transmit luminance and chrominance processors in the encoder module of FIG. 3.

The luminance processor 56 is shown in more detail in FIG. 4 and includes a horizontal lowpass filter 66, a vertical lowpass filter 68, a horizontal 2:1 decimator 70, a vertical 2:1 decimator 72, and several line buffers 74. 76 and 78. The filters 66 and 68 are realized by digital finite impulse response (FIR) filter techniques. The horizontal lowpass filter 66 is a 7-tap FIR filter with a nominal bandwidth of 2.1 MHz. The vertical filter 68 is a 3-tap FIR filter with a nominal vertical bandwidth of, e.g., 60 cycles per picture height (C/PH). The actual frequency responses of these filters are empirically optimized for better subjective picture quality. These filters have linear phase characteristics as a consequence of having symmetric tap coefficients with respect to the center tap.

The decimators 70 and 72 are simple demultiplexing circuits for dropping samples or lines. The line buffers 74, 76 and 78 are used for necessary sampling rate conversion and delay compensations.

The chrominance processor is shown in more detail in the lower portion of FIG. 4 and includes for each of the U and V components a 3-tap vertical lowpass filter 80, 82 identical to that in the luminance processor, and a vertical decimator 84. 86. Note that the chrominance components have each already been horizontally lowpass filtered in the 1 MHz filters provided at the output of the color matrix circuit 54 in the transmit video processor 40 of FIG. 3. Each vertical decimator 84, 86 is a simple circuit which drops every other line of the U and V signal alternatively. The line buffers 88 and 90 function similarly to those in the luminance processor.

Turning now to the audio processor, that component includes two audio source encoders 92 and 94 for program audio an audio/data buffer 96, a gray mode encoder 98 and a 4-PAM modulator 100. A third audio channel may be added in parallel to the program audio source encoders.

The video controller 44 is preferably an event counter which generates all control signals according to a predetermined fixed schedule so that the video processor 40 can function accordingly. This controller is under the control of the transmit controller 12, and its implementation would be well understood by the ordinarily skilled artisan. The video controller 44 contains a black burst generator which generated a black burst signal for the frame synchronizer to synchronize the input NTSC video signal.

The audio controller 46 is preferably also an event counter which generates all control signals according to a predetermined fixed schedule so that the audio processor can function accordingly. This controller is also under the control of the video controller 12.

Figure 5:
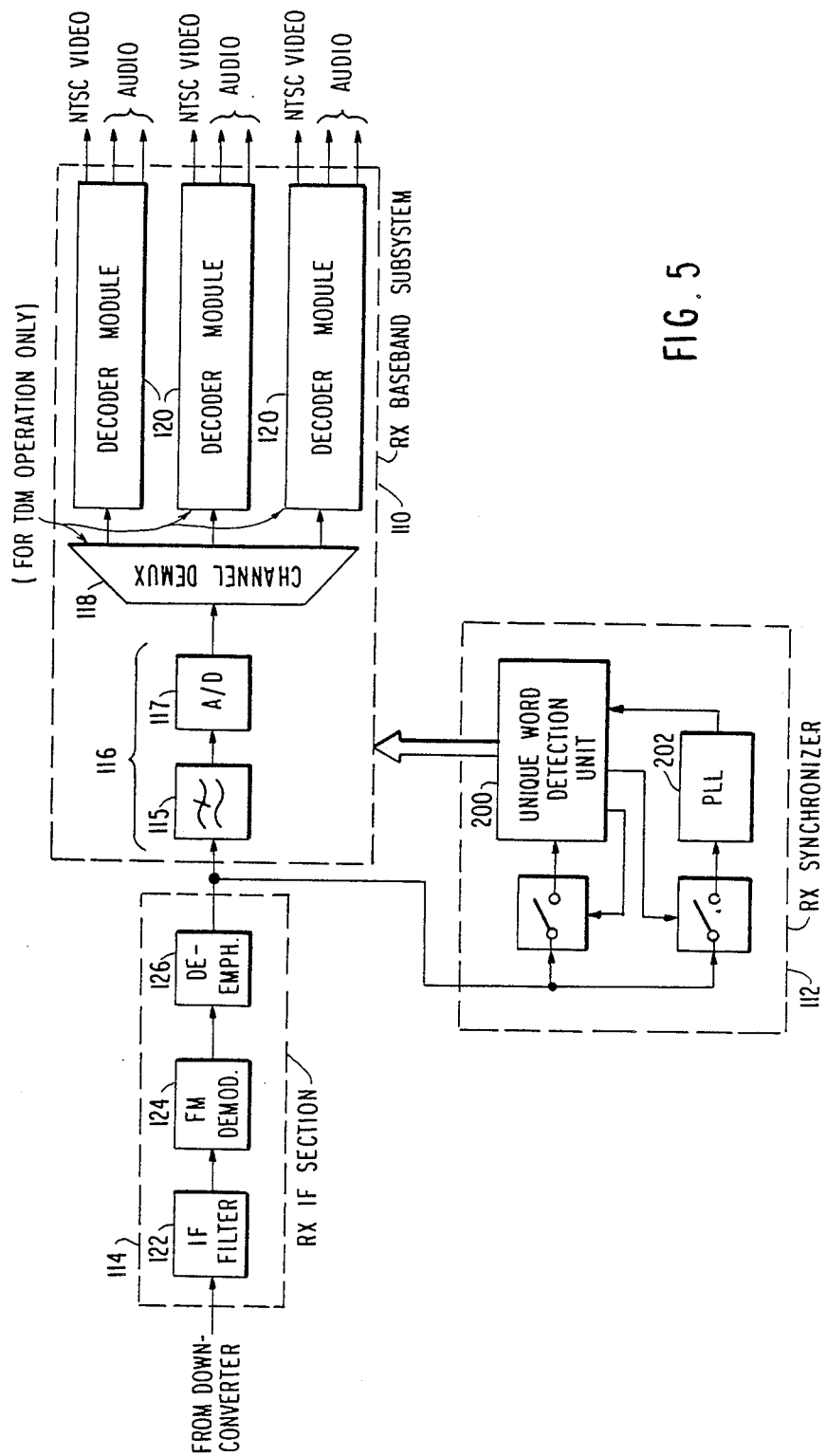
FIG. 5 is a block diagram of the receive unit in the system according to the present invention.

The receive unit can be divided into three subsystems as shown in FIG. 5: the baseband subsystem 110, the receive synchronizer 112 and the IF section 114. The RF equipment is part of the earth station and does not itself form part of this invention, and therefore will not be discussed herein.

The baseband subsystem 110 includes an analog-to-digital interface 116 a TV burst demultiplexer 118, and three decoder modules 120, one for each TV channel. The A/D interface 116 preferably includes a 10.5-MHz analog anti-aliasing filter 115 and an 8-bit A/D converter 117 operated at 35.8 MHz. The demultiplexer 118 separates the three TV signals under non-multiple-access environment. It is not needed under multiple-access environment. Each decoder module 120 is preferably constructed as shown in the block diagram of FIG. 6, and will be described in more detail hereinafter.

In a non-multiple-access environment, the receive synchronizer 112 is shared by all three decoder modules. In a multiple-access environment each TV channel is transmitted, possibly from a different location, with their transmit timing independent of one another except for the requirement of fitting into the TDMA time slots. Therefore the reception of the independent TV signals requires a separate receive synchronizer for each channel.

The IF section 114 includes an IF filter 122 an FM demodulator 124 and a de-emphasis network 126.

Figure 6:
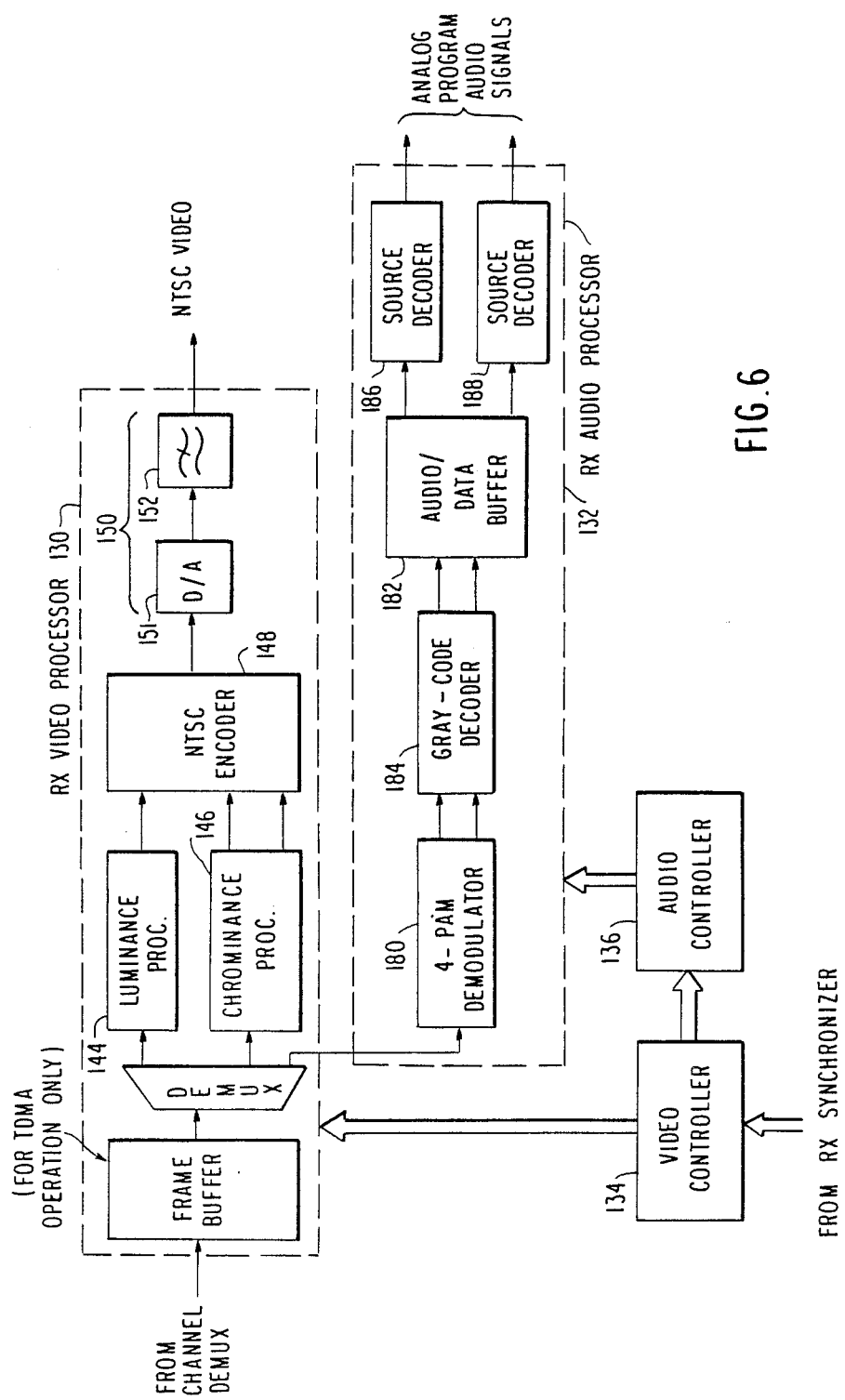
FIG. 6 is a block diagram of a decoder module of FIG. 5.

Turning now to FIG. 6, each decoder module 120 in FIG. 5 includes a video processor 130, an audio processor 132, a video controller 134 and an audio controller 136. A receive frame buffer 138 is included for TDMA systems to receive 8-bit samples from the A/D converter 117 at a burst rate of 35.8 MHz in the form of frame bursts and then demultiplex them into YUV line bursts at the same sample rates but separated in time. Subsequent to the frame buffer 138, the receive video processor includes video time-expansion line buffers, a luminance processor 144, a chrominance processor 146, an NTSC encoder 148, and a digital-to-analog interface 150. The video time expansion line buffers are not separately illustrated in FIG. 6 but are shown as included within the luminance processor 144 and chrominance processor 146 in the diagrams thereof in FIG. 7.

Figure 7:
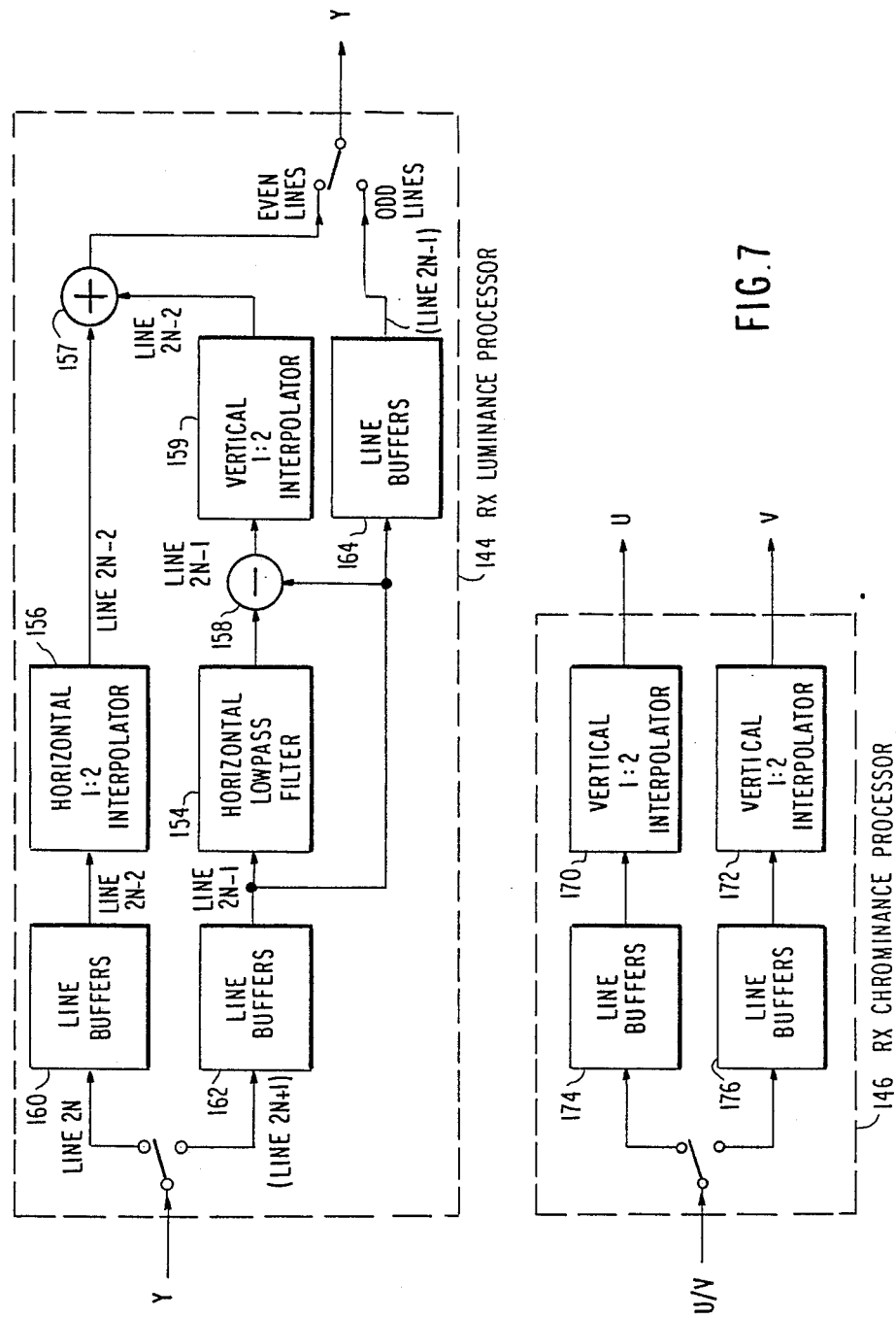
FIG. 7 is a block diagram of the receive luminance and chrominance processors in the decoder module of FIG. 6.

As shown in FIG. 7, the luminance processor 144 includes a horizontal lowpass filter 154, a horizontal interpolator 156, a vertical interpolator 158 and the various line buffers 160, 162 and 164. The horizontal interpolator 156 is a 5-tap FIR lowpass filter, and the vertical interpolator 158 is a 3-tap FIR filter. The tap-coefficients of these FIR filters are selected from various designs by subjective evaluation. The line buffers are used for sampling rate conversion and delay compensation purposes.

The chrominance processor 146 of FIG. 6 includes vertical interpolators 170 and 172 which are identical to that in the receive luminance processor, and line buffers 174 and 176 for sampling rate conversion and delay compensation purposes.

The NTSC encoder 148 in FIG. 6 includes a horizontal interpolator, a chroma modulator an NTSC sync generator, and a multiplexing circuit, all of which are well-known. The interpolator is needed to convert the received U and V signals from 3.58 MHz sampling rate into 7.16 MHz sampling rate each. The ohroma modulator generates a modulated chroma signal from the resultant U and V signals using the phase-amplitude modulation technique according to the NTSC standard. The chroma modulator is simple and includes only a sign inverter and time-multiplexing circuitry. The video sync generator contains ROMs and counters. These circuits need not be illustrated or described in detail for a complete understanding of this invention.

The D/A interface 150 of FIG. 6 preferably includes a 9-bit D/A converter 151 operated at 14.32 MHz and an output lowpass filter 152 with bandwidth of 4.2 MHz.

The receive audio processor 132 in FIG. 6 includes the 4-level PAM demodulator 180 audio buffer 182, gray-code decoder 184, and the program audio source decoders 186 and 188. A third audio channel decoder and/or an order wire channel can be added in parallel to the program source decoders.

The video controller 134 of FIG. 6 generates all control timing signals for the video processor 130 and the receive frame buffer 138. The hardware basically includes ROMs, PROMs, and counters as is common in the art.

The audio controller 136 in FIG. 6 is under the control of the video processor 130 and the receive frame buffer 138. Again, the hardware basically includes ROMs, PROMs, and counters.

The receive synchronizer 112 in FIG. 5 includes a unique word detection unit 200 and a phase-lock loop 202. These could be implemented in a variety of ways, e.g.. the unique word detection unit 200 may include a horizontal unique word (HUW) detector, a vertical unique word (VUW) detector a sync loss detector and a timing generator, each of which may be implemented in a straightforward manner.

The overall operation of the system will be apparent from the description given above and only the operation of the luminance and chrominance processors at the transmitter and receiver will be further described here, beginning with the operation at the transmit side with reference to FIG. 4.

For even lines, e.g., e.g., LINE 2N (where N is an integer). the luminance component signal of FIG. 1(a) is received at the input of lowpass filter 66. The output of filter 66 will appear as in FIG. 1(b), with the filtered luminance signal for LINE 2N being stored in the line buffer 74. The filtered luminance signal for LINE 2N is also passed to subtractor 67 where it has subtracted from it the output of filter 66 to obtain the signal shown in FIG. 1(c). This signal is then provided to vertical lowpass filter 68 which generates an output signal corresponding to LINE 2N−1. This output signal is immediately stored into line buffer 66.

When the next odd line is received e.g., LINE 2N+1, the switch 69 is in its upper position to provide the filtered LINE 2N luminance signal to the horizontal decimator 70 while the horizontally lowpass filtered LINE 2N+1 luminance signal is stored in the buffer 74. Once again, the filtered luminance signal for LINE 2N+1 is also passed to subtractor 67 where it has subtracted from it the output of filter 66, to obtain the signal shown in FIG. 1(c) which is then provided to vertical lowpass filter 68.

In the preferred embodiment herein, the filter 68 is a three-tap filter so that it will be providing outputs for LINE 2N while receiving inputs for LINE 2N+1, i.e., it will exhibit a one-line delay. The output from filter 68 corresponding to LINE 2N will be discarded by the vertical 2:1 decimator 72. At the same time, the previously stored signal corresponding to LINE 2N−1 will be output from line buffers 78. Note that the switch 77 will be at its lower position to send out this signal.

During this time the horizontally filtered LINE 2N luminance signal is provided from buffer 74 to horizontal 2:1 decimator 70 for storage in the line buffer 76.

When the next even line (LINE 2N+2) is received, it is processed by filter 66 and subtractor 67 as before. The filtered LINE 2N+2 signal is provided to buffer 74 while the filtered LINE 2N+1 luminance signal is provided through switch 69 (which is now in its lower position) to the adder 71. At this time, the filter 68 will be providing an output corresponding to LINE 2N+1, which is passed unchanged by the decimator 72. The adder 71 will then combine this vertically lowpass filtered high frequency components of the LINE 2N+1 luminance signal with the low frequency component of the LINE 2N+1 luminance signal from buffer 74, and the result is provided to the line buffer 78 for storage while the previously processed even line luminance signal is provided through switch 77 from line buffers 76 as the luminance component to be transmitted.

When the LINE 2N+3 luminance signal is received, the LINE 2N+2 luminance signal is provided from buffer 74 through decimator 70 to the buffer 76. At this time, the processed LINE 2N+1 luminance component is provided from line buffers 78 through switch 77 to the output of processor 56. Also at this time, no signal is provided into or out of adder 71.

It can be seen from this description that the switches 69 and 77 are toggled in opposite directions for switching to their upper and lower positions. During reception of an odd line luminance component signal at the input of filter 66, switch 69 is at its upper position while switch 77 is at its lower position. During reception of an even line luminance component signal at the input of filter 66, switches 69 and 77 are at their lower and upper positions, respectively. The separately processed even and odd line luminance signals are then alternately provided at the output of processor 56.

At the receive side, with reference to FIG. 7, the odd line luminance components are passed through buffers 162 and 164 to the receive luminance processor output without change, since these signals already include the entire low frequency component of the luminance signal added by adder 71 in the transmit luminance processor 56 of FIG. 4, together with the filtered and decimated high frequency component.

For the even lines, the low frequency component has been decimated and this is horizontally 1:2 interpolated at 156 to obtain the full low frequency signal which is provided to one input of adder 157. In addition, filter 154 and subtractor 158 are used to extract the filtered and decimated high frequency component from the odd lines, and this is interpolated at 159 and added to the low frequency component in adder 157 to obtain a signal of the same make-up as the odd line signals. The capacities of buffers 160, 162 and 164 are chosen for the proper delay compensation. In a preferred embodiment, the capacities and timing sequences of the buffers 160, 162 and 164 are chosen such that the outputs of both the interpolator 156 and the interpolator 159 correspond to line 2N−2 of the video signal when the input to line buffers 160 and 162 is LINE 2N.

The invention is particularly advantageous in its use of component signals as the basis for performing bandwidth reduction of 525-line, 2:1 line-interlaced. 60-Hz field rate video signal. It is further advantageous in its use of a low-passed luminance signal, instead of differential luminance signal, for lines not requiring the transmission of high frequency contents. By avoiding the use of a differential signal the system is less affected by transmission channel noise since the low-frequency noise which is subjectively more objectionable to the human eye than high-frequency noise, will be confined to each line instead of spreading to adjacent lines.

While the invention has been described above in the context of a particular implementation, it should be appreciated that the system implementation approach illustrated by block diagrams of FIG. 2 through FIG. 7 is but one of the many possible ways of system implementation. For TDM operation, it is assumed that multiple TV channels can be collected at the same location, or at least they can be synchronized properly. This TDM signal is then beamed up to the satellite using a single carrier. The number of TV channels to be multiplexed is a function of the available link budget, the requirements on signal quality and the hardware cost constraints.

The chrominance component signals used are not restricted to U and V only. Other chrominance component signals which have the advantage of reduced signal bandwidths may be used instead.

What is claimed:

1. A signal transmission system for processing at least portions of at least first and second video signals, each portion having first and second components, wherein the first component includes both a high frequency part and a low frequency part, transmitting the processed signal portions from a transmitting station to a receiving station and generating reconstructed video signal portions from said transmitted video signal portions at said receiving station, said system comprising:

first means at said transmitting station for reducing the baseband bandwidth of said first component of each of the first and second video signal portions by a first signal process to obtain processed first components for each of said first and second video signals;

second means at said transmitting station for reducing the baseband bandwidth of said second components of each of said first and second video signal portions by a second signal process different from said first signal process to obtain a processed second component for each of said first and second video signals; and multiplexing means at said transmitting station for multiplexing the processed first and second components for said first and second video signals for transmission via a common carrier.

2. A signal transmission system as defined in claim 1, further comprising means at said receiving station for combining said first and second components for each video signal portion to obtain said reconstructed video signal portions.

3. A signal transmission system for processing at least portions of at least first and second video signals with each portion having even and odd lines with each line having both first and second components, transmitting the processed signal portions from a transmitting station to a receiving station and generating first and second reconstructed video signal portions from said transmitted video signal portions at said receiving station, said system comprising:

first means at said transmitting station for reducing the bandwidth of even lines of said first video signal portion by a first signal process and for reducing the bandwidth of odd lines of said first video signal portion by a second signal process different from said first signal process to obtain processed even and odd line components for each of said first and second video signal portions;

second means at said transmitting station for reducing the bandwidth of even lines of said second video signal portion by said first signal process and for reducing the bandwidth of odd lines of said second video signal portion by said second signal process to obtain processed even and odd line components for said second video signal portion; and multiplexing means for multiplexing together the processed components for said first and second video signal portions for transmission via a common carrier.

4. A signal transmission system as defined in claim 3, wherein said first and second means process the second component of each of said even and odd lines similarly, while subjecting the first components of said even and odd lines to different signal processes.

5. A signal transmission system for processing at least portions of at least first and second video signals, transmitting the processed signal portions from a transmitting station to a receiving station and generating first and second reconstructed video signal portions from said transmitted video signal portions to said receiving station, said system comprising:

first means at said transmitting station for filtering parts of said video signal portions in both vertical and horizontal dimensions to obtain filtered parts of each of said first and second video signal portions;

decimating means at said transmitting station for decimating said filtered parts to obtain processed signal parts of each of said first and second video signal portions;

multiplexing means for multiplexing together the processed signal parts of both of said first and second video signal portions for transmission to said receiving station via a common carrier; and third means at said receiving station for combining said processed signal parts to obtain said reconstructed video signal portions.

6. A method of transmitting a signal comprising the steps of processing at least portions of at least first and second video signals with each portion having both first and second components, wherein the first component includes both a high frequency part and a low frequency part, transmitting the processed signal portions from a transmitting station to a receiving station and generating reconstructed video signal portions from said transmitted video signal portions at said receiving station, said processing step comprising the steps of:

reducing the bandwidth of said first component of each of said video signal portions by a first signal process at said transmitting station to obtain processed first components for each of said first and second video signals;

reducing the bandwidth of said second component of each of said first and second video signal portions by a second signal process at said transmitting station different from said first signal process to obtain a processed second component for each video signal; and multiplexing the processed first and second components for said first and second video signals for transmission from said transmitting station via a common carrier.

7. A signal transmission method as defined in claim 6, wherein said generating step at said receiving station comprises combining said first and second components for each of said first and second video signal portions to obtain said reconstructed video signal portions.

8. A signal transmission method as defined in claim 6, wherein said step of reducing said bandwidth of said luminance component comprises:

filtering portions of said luminance component in both vertical and horizontal dimensions; and decimating said filtered luminance component portions.

9. A signal transmission method as defined in claim 6, wherein said video signal includes alternating even and odd lines, and wherein said step of reducing said bandwidth of said luminance component comprises subjecting the luminance components of even and odd lines to different bandwidth reduction processes.

10. A signal transmission method as defined in claim 9, wherein said step of reducing said bandwidth of said first component of each video signal portion comprises:

horizontally lowpass filtering the first component of one line to obtain the low frequency portion thereof; and vertically lowpass filtering the high frequency part of said first component of a subsequent line.

11. A signal transmission method as defined in claim 10, wherein said step of reducing said bandwidth of said first component of each video signal portion further comprises horizontally decimating said low frequency portion of said first component of said one line.

12. A signal transmission method as defined in claim 10, wherein said step of reducing said bandwidth of said first component of each video signal portion further comprises means for vertically decimating said high frequency portion of the first component of said subsequent line.

13. A signal transmission method as defined in claim 9, wherein said step of reducing the bandwidth of said second component of each said video signal portion comprises subjecting said second component to the same signal process for both even and odd lines.

14. A signal transmission method as defined in claim 9, wherein said generating step at said receiving station comprises deriving the first component of at least some of the lines of each reconstructed video signal portion from the transmitted first components of both even and odd lines.

15. A signal transmission method as defined in claim 14, wherein the even lines of each said reconstructed video signal portion are derived from the transmitted first components of both even and odd lines.

16. A signal transmission method as defined in claim 6, wherein said step of reducing the bandwidth of said chrominance component comprises both horizontally and vertically lowpass filtering said chrominance component.

17. A signal transmission method as defined in claim 16, wherein said step of reducing said bandwidth of said second component of each said video signal portion further comprises vertically decimating the filtered second component.

18. A signal transmission method as defined in claim 6, wherein said first component is a luminance component and said second component is a chrominance component.

19. A signal transmission method as defined in claim 1, wherein said first component is a luminance component and said second component is a chrominance component.

20. A signal transmitting method comprising the steps of processing at least portions of at least first and second video signals with each portion having even and odd lines with each line having both first and second components, transmitting the processed signal portions from a transmitting station to a receiving station and generating first and second reconstructed video signal portions from said transmitted video signal portions at said receiving station, said processing step comprising:

reducing the bandwidth of even lines of said first video signal portion by a first signal process and reducing the bandwidth of odd lines of said first video signal portion by a second signal process different from said first signal processing to obtain processed first video signal portions;

reducing the bandwidth of even lines of said second video signal portion by said first signal process and reducing the bandwidth of odd lines of said second video signal portion by said second signal process to obtain processed second video signal portions; and multiplexing said processed first and second video signal portions for transmission via a common carrier.

21. A signal transmission method as defined in claim 20, wherein both of said reducing steps for each of said first and second video signal portions comprise processing the second component of each of said even and odd lines similarly, while subjecting the first components of said even and odd lines to different signal processes.

22. A signal transmission method comprising the steps of processing at least portions of at least first and second video signals, transmitting the processed signal portions from a transmitting station to a receiving station and generating first and second reconstructed video signal portions from said transmitted processed signal portions at said receiving station, said processing step comprising:

filtering parts of each of said first and second video signal portions in both vertical and horizontal dimensions to obtain filtered parts of each of said first and second video signal portions;

decimating said filtered parts to obtain processed signal parts of each of said first and second video signal portions;

multiplexing said processed signal parts of said first and second video signal portions for transmission via a common carrier; and combining said processed signal parts at said receiving station to obtain said first and second reconstructed video signal portions.

23. A signal transmission system for processing at least portions of at least first and second video signals with each portion having both first and second components, transmitting the processed signal portions from a transmitting station to a receiving station and generating first and second reconstructed video signal portions from said transmitted video signal portions at said receiving station, said system comprising:

first means at said transmitting station for reducing the bandwidth of said first components of each of said first and second video signal portions by a first signal process, said first means comprising filtering means at said transmitting station for filtering portions of said first component in both vertical and horizontal dimensions, and decimating means at said transmitting station for decimating said filtered first component portions to obtain processed first components for each of said first and second video signal portions;

second means at said transmitting station for reducing the bandwidth of said second component of each of said first and second video signal portions by a second signal process different from said first signal process to obtain processed second components for each of said first and second video signal portions; and multiplexing means for multiplexing the processed portions of each of said first and second video signal portions for transmissions via a common carrier.

24. A signal transmission system for processing at least portions of at least first and second video signals, each portion including both even and odd lines having both first and second components, transmitting the processed signal portions from a transmitting station to a receiving station via an RF carrier and generating reconstructed video signal portions from said transmitted video signal portions at said receiving station, said system comprising:

first means at said transmitting station for reducing the bandwidth of said first component of each of said first and second video signal portions by a first signal process to obtain processed first components for each of said first and second video signals, said first means comprising means for subjecting the first components of even and odd lines to different bandwidth reduction processes;

second means at said transmitting station for reducing the bandwidth of said second component of each of said first and second video signal portions by a second signal process different from said first signal process to obtain processed second components for each of said first and second video signals; and multiplexing means for multiplexing together the processed first and second components for said first and second video signals for transmission via a common carrier.

25. A signal transmission system as defined in claim 24, wherein said first means comprises means for horizontally lowpass filtering the first component of one line to obtain the low frequency portion thereof, and means for vertically lowpass filtering the high frequency component of said first component of a subsequent line.

26. A television signal transmission system as defined in claim 25, wherein said first means further comprises means for horizontally lowpass filtering the first component of one line to obtain the low frequency portion thereof, and means for horizontally decimating said low frequency portion of said first component of said one line.

27. A signal transmission system as defined in claim 25, wherein said first means further comprises means for vertically decimating said high frequency portion of the first component of said subsequently line.

28. A signal transmission system as defined in claim 24, wherein said second means subjects said second component to the same signal process for both even and odd lines.

29. A signal transmission system as defined in claim 24, wherein said receiving station includes means for deriving the first component of at least some of the lines of each reconstructed video signal portion from the transmitted first components of both even and odd liens.

30. A signal transmission system as defined in claim 29, wherein the even lines of each reconstructed video signal portion are derived from the transmitted first components of both even and odd lines.

31. A signal transmission system for processing a video signal portion having both first and second components, transmitting the processed signal portion from a transmitting station to a receiving station via an RF carrier and generating a reconstructed video signal portion from said transmitted video signal portion at said receiving station, said system comprising:

first means at said transmitting station for reducing the bandwidth of said first component by a first signal process; and second means at said transmitting station for reducing the bandwidth of said second component by a second signal process different from said first signal process, wherein said second means comprises means for both horizontally and vertically lowpass filtering said second component.

32. A signal transmission system as defined in claim 31, wherein said second means further comprises means for vertically decimating the filtered second component.

* * * * *